United States Patent Office 2,895,354
Patented July 21, 1959

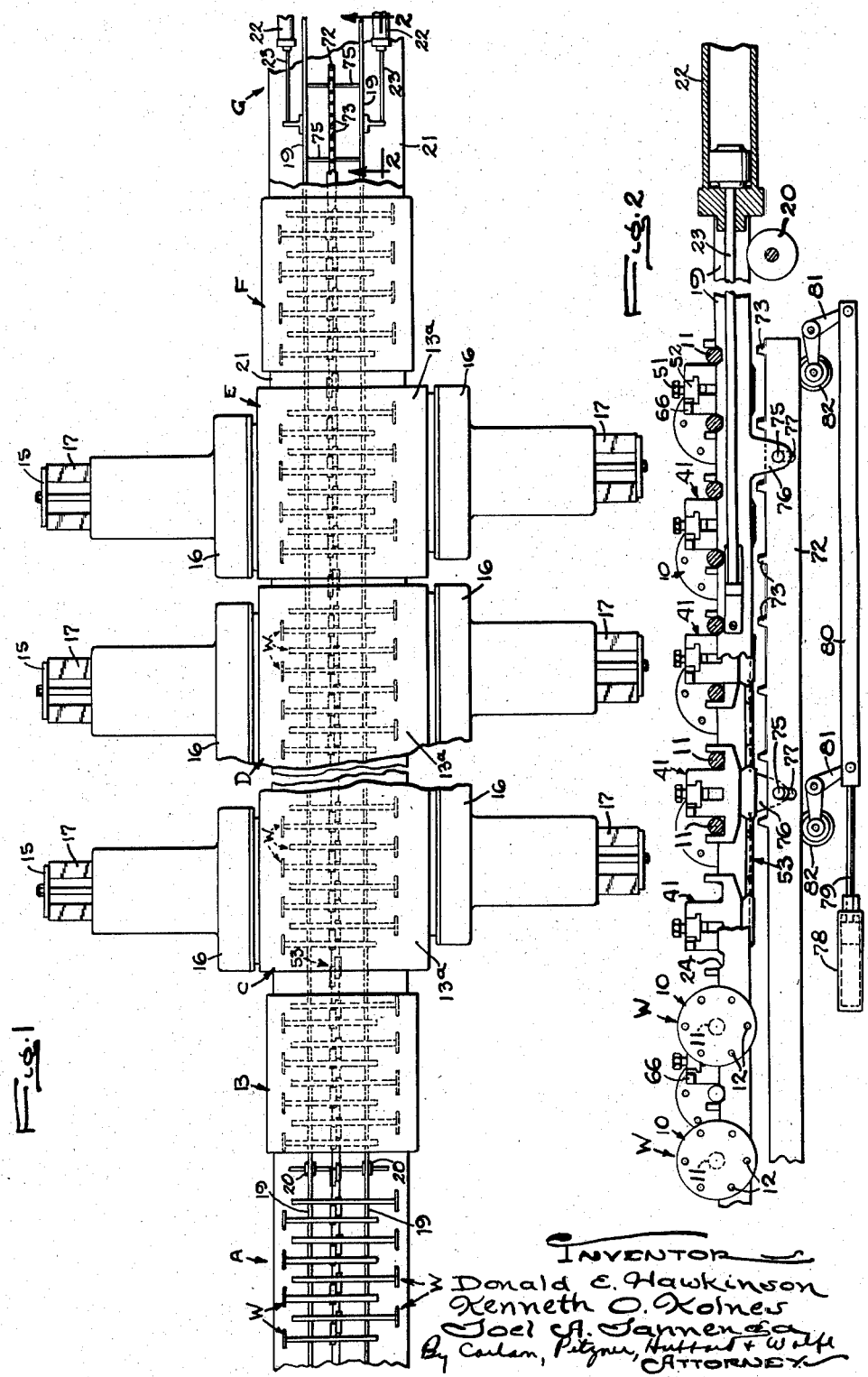

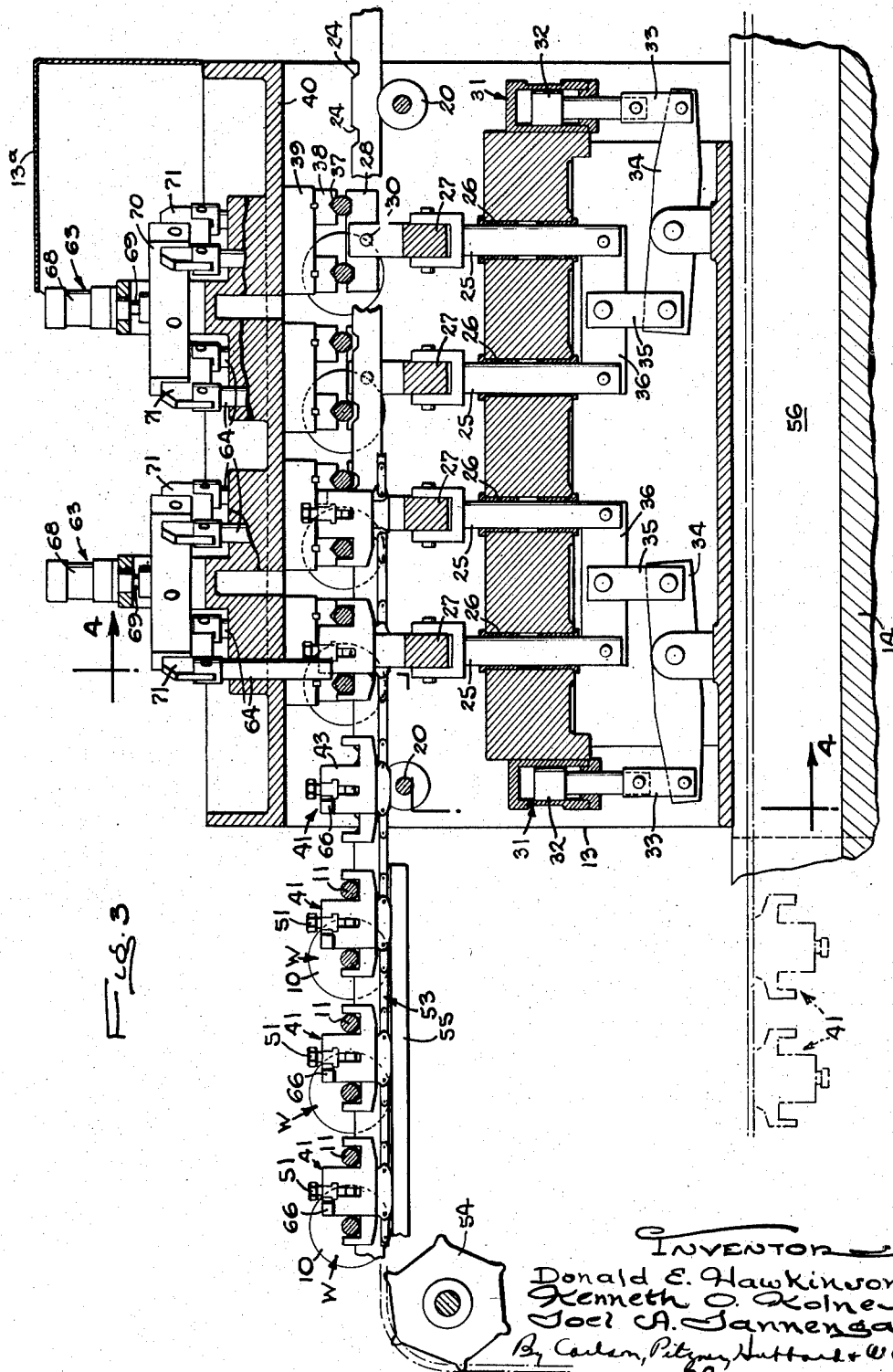

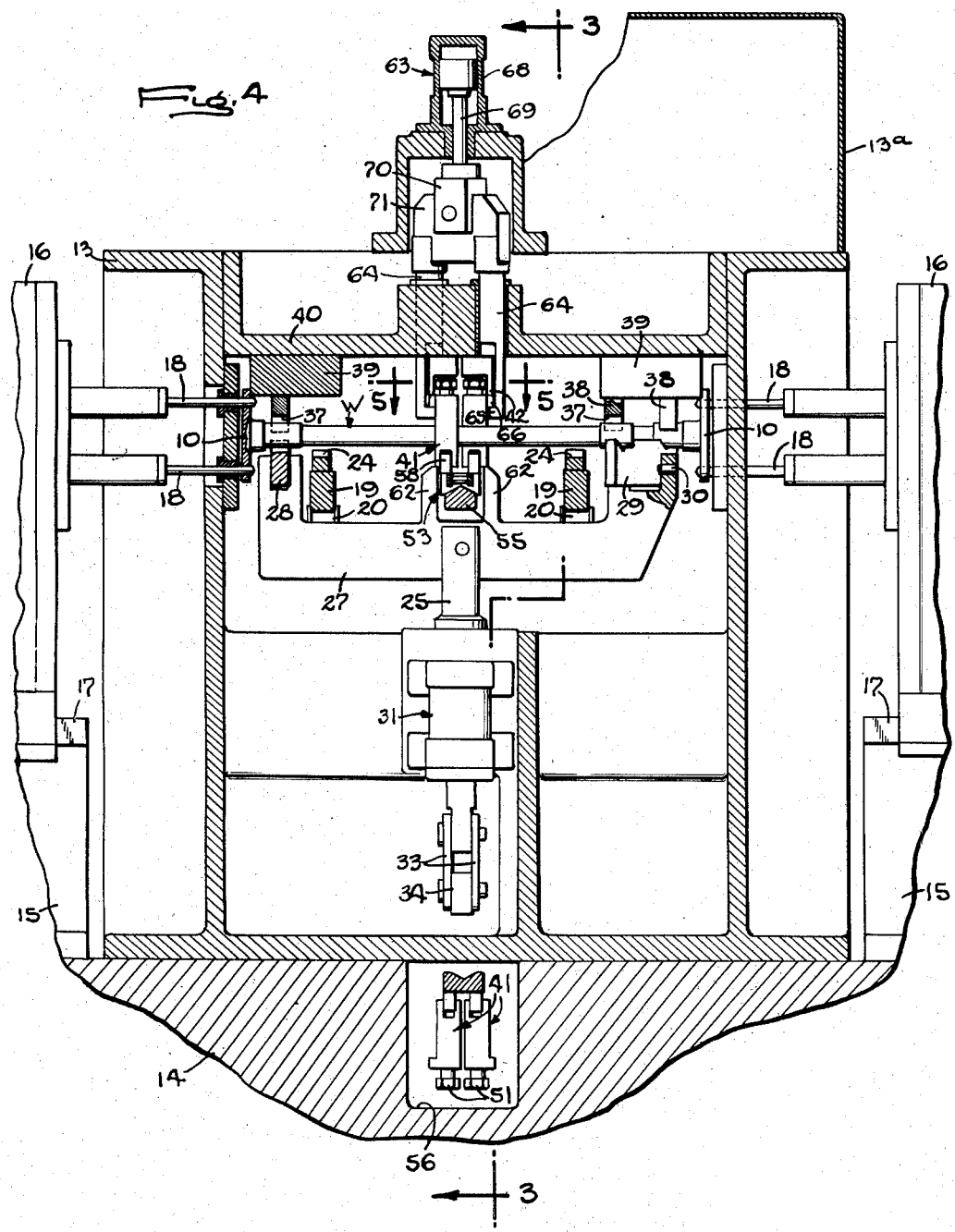

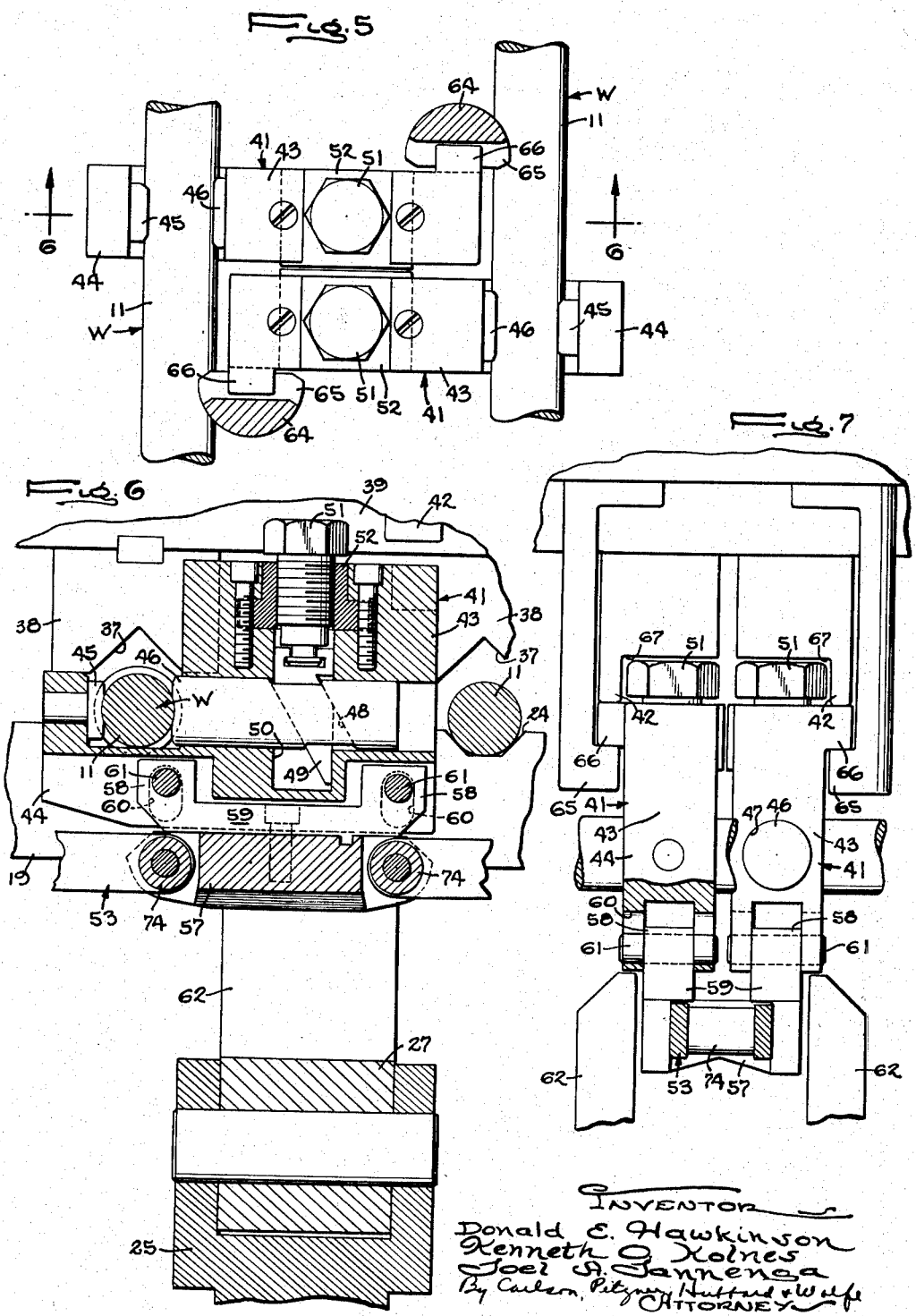

2,895,354

MULTIPLE STATION MACHINE TOOL

Donald E. Hawkinson, Kenneth O. Kolnes, and Joel A. Jannenga, Rockford, Ill., assignors to Greenlee Bros. & Co., Rockford, Ill., a corporation of Illinois Application May 11, 1956, Serial No. 584,301

11 Claims. (Cl. 77—64)

This invention relates to so-called process machine tools in which workpieces are indexed step by step through a succession of stations at which each workpiece is clamped against accurately positioned abutments while metal removing operations are being performed on the pieces.

The primary object of the invention is to adapt a multiple station machine tool of the above character for the performance of a plurality of metal removing operations on an elongated workpiece of circular cross section which does not permit of accurate location angularly about its longitudinal axis by direct contact of its exterior with the locating abutments.

A more detailed object is to provide at each machining station a novel mechanism for locating the workpieces in two transverse directions by direct engagement with locating abutments and angularly by engagement of a separate abutment with a projecting locating member detachably secured to the workpiece during its progress through the successive stations.

Another object is to form the detachable locating members as parts of a novel conveyor for maintaining the desired spacing and approximate angular positions of the locating members and effecting return of the same to a loading position.

The invention also resides in the novel construction and arrangement with permits the locating members to be easily attached to and detached from the workpieces and the latter to be spaced close together during their progress through the machining stations.

Other objects and advantages of the invention will become apparent from the following detailed description taken in connection with the accompanying drawings, in which Figure 1 is a fragmentary plan view of a machine tool organization embodying the novel features of the present invention.

Fig. 2 is a fragmentary sectional view taken along the line 2—2 of Fig. 1, with some of the parts broken away.

Fig. 3 is a fragmentary sectional view taken along the line 3—3 of Fig. 4, some of the parts being broken away.

Fig. 4 is a fragmentary sectional view taken along the line 4—4 of Fig. 3 and showing workpieces in their clamped positions.

Fig. 5 is a fragmentary sectional view taken along the line 5—5 of Fig. 4.

Fig. 6 is a fragmentary sectional view taken along the line 6—6 of Fig. 5 showing the workpieces in their transfer positions.

Fig. 7 is an enlarged view of a part of Fig. 4 with some of the parts broken away and shown in section.

The invention is shown in the drawings for purposes of illustration embodied in a machine tool organization for performing drilling, chamfering and reaming operations on annular flanges 10 of automotive vehicle axles W each having an elongated cylindrical body 11 so as to be of circular cross section throughout its length. Angularly spaced holes 12 (Fig. 2) drilled at a work station C (Fig. 1) are chamfered and reamed at subsequent work stations D and E. Although one type of workpiece is shown, it is to be understood that the invention is not limited to this type or the particular character of the metal removing operations performed thereon, but is intended to cover all modifications and alternative constructions and arrangements falling within the spirit and scope of the appended claims.

In the exemplary machine tool organization, workpieces W are loaded in groups onto a shiftable transfer mechanism at a loading station A at one end of a line-up of machines, are shifted successively to the work stations C, D and E, and finally are moved into an unloading station G at the other end of the line. At each work station, the workpieces first are disconnected from the transfer mechanism, then are positioned transversely in two directions with respect to their longitudinal axes and angularly about the latter, next are clamped in such positions for the metal removing operations, and, after these operations, are released for reconnection to the transfer mechanism and advance therewith to the next station.

The locating and holding mechanism for each work station and their power actuators are supported on a hollow frame 13 (Figs. 1, 3 and 4) supported on a floor 14 between two beds 15. Suitable hoods 13$^a$ cover the exposed working parts on the tops of the respective frames. The beds 15 extend transversely of the path of the workpieces through the successive stations and support tool heads 16 on guideways 17 for movement transversely toward and away from the workpiece path. Each head rotatably supports a plurality of metal removing tools 18 (Fig. 4) with their axes positioned to correspond to the desired locations of the holes 12 in the flanges 10 of the workpieces W clamped rigidly at the station. In this instance, there are six holes and therefore six tools for each flange.

The transfer mechanism herein comprises two laterally spaced parallel bars 19 which extend through all of the stations and are mounted for endwise reciprocation on guide rollers 20 supported on the respective work frames 13 and on end frames 21 extending beyond the machining stations C, D, and E and through the loading and unloading stations A and G. Endwise reciprocation of the bars is effected by fluid pressure actuators having stationary cylinders 22 (Figs. 1 and 2) mounted on the end frame adjacent the unloading station G and pistons whose rods 23 are secured to the respective bars. On their upper edges, the bars are formed with upwardly opening recesses 24 (Figs. 2 and 3) alined transversely of the bars to receive the workpieces and support the latter in horizontal positions with their axes parallel to each other and spaced apart longitudinally of the bars. Herein, the bars are spaced apart laterally to underlie axially spaced portions of the workpieces with the flanges 10 of alternate pieces disposed on the outer sides of the bars. There are eight workpieces in each group to be transferred together from station to station and to be operated on at the same time in each station with four sets of tools 18 in each head 16 for the four flanges on each side of the bars.

After being advanced into each of the work stations C, D and E the workpieces are disconnected from the transfer bars 19, in this instance by lifting the pieces vertically off from their bars to their working positions. For this purpose, elevator rods 25 (Figs. 3 and 4) are slidable vertically in guides 26 on the work frames 13 and carry at their upper ends yokes 27 each having spaced jaws 28 and 29 engageable with the undersides of the workpieces outwardly from their points of engagement by the transfer bars. Each jaw is formed with two recesses spaced apart longitudinally of the transfer bars to accommodate two adjacent workpieces so that there are four elevator rods and four yokes at each work station. Alternating workpieces of each group with their flanges 10 on the same side of the transfer bars herein are longer than the other four workpieces of the group. In this case, one jaw 28 of each yoke extends generally parallel to the bars as shown at the left of Fig. 4 and the other jaw 29 is inclined relative to the bars as shown at the right in this figure for engaging the cylindrical bodies 11 of adjacent workpieces at points spaced apart longitudinally of the bodies. To equalize the pressure exerted by the jaws of each yoke on each pair of adjacent workpieces, the yokes are swiveled on the elevator rods and the jaws are swiveled as indicated at 30 on the yoke.

The elevator rods 25 at each work station are raised and lowered herein by two pressure fluid actuators one for each pair of elevator rods and each having a cylinder 31 secured to the frame 13 (Figs. 3 and 4) and a piston 32 whose rod is connected by a link 33 to one end of a lever 34 fulcrumed on the frame. At its other end, the lever is pivotally connected by a link 35 to the center of a floating lever 36 whose ends are pivotally connected to lower ends of two elevator rods.

As the rods 25 are elevated, the workpieces W at each work station are lifted off the transfer bars 19 and are raised into engagement with downwardly facing V-shaped seats 37 in abutments 38 (Figs. 3, 4 and 6) secured to blocks 39 rigid with an overhead crosspiece 40 of the frame 13. These abutments cooperate with the jaws to form clamping elements rigidly holding the workpieces in their final working locations and serve to position both ends of each workpiece in vertical and horizontal directions transverse to the axis of the piece.

Being of circular cross section throughout its length, each workpiece W has no exterior surface which may be contacted directly by abutments at the work stations C, D and E for locating the workpiece angularly about its axis and thereby insuring that the flange is positioned properly for operation of the tools 18 at each station. In accordance with the present invention, novel means is provided for accurately locating each workpiece angularly about its axis while still permitting direct contact of the work by the clamping jaws 28 and 29 and the abutments 38 for accurate location of the work in two directions transverse to the axis. This means comprises a locating member 41 detachably secured to the workpiece during its progress through the successive stations and projecting from the workpiece for clamping engagement with a fixed abutment 42 which is spaced along the workpiece path from each of the V's 37 and therefore from the axis of a workpiece seated in the V's.

Each locating member 41 in this instance comprises a generally rectangular body 43 (Figs. 5, 6 and 7) having an arm 44 projecting therefrom and supporting a stationary clamping jaw 45. A second jaw 46 in the form of a cylindrical pin is slidable toward and away from the fixed jaw in a bore 47 of the body and is formed with an inclined slot 48 intermediate its end to receive a wedge 49. The latter is slidable transversely of the pin in a cross bore 50 and is connected to the inner end of a bolt 51 which projects from the body and is threaded in a nut 52 secured in a recess in the body, the bolt and the wedge being connected for axial movement together but for rotation relative to each other. With this arrangement, the slidable jaw 46 is shifted toward and away from the fixed jaw 45 and into and out of clamping engagement with the cylindrical body 11 of a workpiece W between the two by turning the bolt 51 to shift the wedge inwardly and outwardly relative to the body 43.

To retain control of each locating member 41 so that the workpiece W clamped thereby remains in approximately the same angular position during transfer from one work station to the next and to facilitate attachment of the member to a workpiece and return of the member to the loading station A from the unloading station G, the members preferably are carried by an endless conveyor 53 extending along the path of the workpieces through the successive stations and shiftable forwardly along the path during advance of the transfer bars 19. The conveyor herein is a chain of the roller type extending around sprockets 54 (Fig. 3) on the end frames 21 and having an upper straight horizontal run paralleling the transfer bars and slidable along stationary guides 55 (Figs. 3 and 4) supported on the end and work frames 21 and 13. A lower run of the chain extends beneath the work frames in a recess 56 in the floor (Figs. 3 and 4). To permit alternate workpieces to be reversed end for end and still enable the transfer bars 19 to contact each workpiece at widely spaced points along its length, the chain is disposed between the bars.

Each locating member 41 is mounted on the chain 53 for limited movement laterally thereof and with the work receiving recesses defined by the jaws 45 and 46 of adjacent members opening laterally of the chain and spaced apart along the chain the same distances as the recesses 24 of the transfer bars 19. The members are arranged in pairs and each pair is mounted on a block 57 (Figs. 6 and 7) forming one link of the chain. To provide the last motion, the inner edge portion of the body of each member is bifurcated to straddle upstanding lugs 58 at opposite ends of a bar 59 bolted to the outer side of the block along the side edges thereof and is slotted at 60 to receive pins 61 projecting rigidly from opposite sides of the lugs. The bodies 43 of the two locating members then extend along the side edges of the block and the arms 44 of the members project in opposite directions along the chain from the block. On its inner side, each block 57 projects beyond the other parts of the chain and is grooved to slide along the stationary guide bars 55.

The upward motion of the yokes 27 for lifting the workpieces from the transfer bars 19 also is utilized to raise each pair of locating members 41 approximately to their final clamped positions. For this purpose, each yoke is formed with two upstanding lugs 62 (Figs. 4 and 7) spaced apart to straddle the chain guide 55 and the block 57 supporting the members and to engage the portions of the latter overhanging the block.

Clamping of the locating members 41 against the abutments 42 at each work station preferably is effected by power actuators 63 (Figs. 3 and 4) separate from the elevator actuators 31 for the workpieces to enable the latter to be positioned angularly before application of the final clamping pressure thereto. In this instance, both the angular locating actuators and the abutments 42 are mounted above the path of the workpieces on the overhead crosspiece 40 of each work frame 13. Each actuator is connected to four clamping rods 64 slidable vertically in the crosspiece and each having a lateral projection 65 providing a clamping surface which faces upwardly toward and is spaced from one of the abutments. Each clamping rod is engageable with a lug 66 (Figs. 5 and 7) projecting laterally from one side of the body 43 of the locating member to be clamped and presses the lug upwardly against a downwardly facing surface on the cooperating abutment. The latter is formed as a block secured rigidly to the crosspiece and recessed as indicated at 67 to receive the bolt 51 of the locating member projecting above the lug 66 thereon.

Each of the actuators 63 for the clamping rods 64 comprises a cylinder 68 (Figs. 3 and 4) secured to a bracket rigid with the frame crosspiece 40 and having a piston whose rod 69 is pivotally connected to the center of a floating link 70. Opposite ends of the latter in turn are pivotally connected to the centers of two auxiliary links 71 whose ends pivotally support the upper ends of a pair of clamping rods 64. These pairs of rods are spaced apart longitudinally of the chain 53 to accommodate the respective pairs of locating members and the rods of each pair are spaced apart transversely of the chain with their projections 65 extending inwardly toward each other to underlie the respective lugs 66 which project outwardly from the bodies 43 of each pair of locating members and transversely of the chain. When pressure fluid is admitted to opposite ends of the actuators 63, the rods connected thereto shift between upper positions of clamping engagement of the projections with the lugs on the locating members to be clamped and lower positions in which the lugs may move across the projections and longitudinally of the chain with workpieces seated in the transfer bar recesses 24.

To insure advance of the locating members 41 in unison with the workpieces and thereby facilitate accurate positioning of the workpieces at the successive stations, novel means is provided for connecting the chain 53 to the transfer bars 19 during advance of the latter and disconnecting the chain to permit retraction of the bars relative to the chain. This means which also simplifies the apparatus by enabling the same power actuators 22 to be utilized to advance both the chain and the bars comprises a member 72 (Figs. 1 and 2) shiftable transversely of and into and out of driving engagement with the upper run of the chain and connected to the transfer bars 19 for movement in unison therewith back and forth longitudinally of the chain. In the present instance, this member is a horizontal rack bar underlying the upper run of the chain and mounted on the transfer bars for vertical movement relative thereto between an upper position in which upwardly projecting teeth 73 on the rack engage spaced rollers 74 (Figs. 6 and 7) on the chain and a lower position in which the teeth are spaced below the chain as shown in Fig. 2. This mounting comprises spaced horizontal bars 75 which are rigid with and span lugs 76 depending from the transfer bars and which extend through vertical slots 77 in the rack bar.

Movement of the rack bar 73 into its upper driving position is effected by an actuator having a cylinder 78 mounted on the end frame 21 supporting the transfer bar actuators 22 and a piston whose rod 79 is pivotally connected through a link 80 to one arm of each of two bell cranks 81 fulcrumed on the end frame. The other bell crank arms carry rollers 82 which receive and support the underside of the rack bar. When pressure fluid is admitted to the rod end of the cylinder, the rollers are raised and the rack bar is shifted to its upper position, the bar descending out of engagement with the chain 53 but remaining in contact with the rollers 82 under the force of gravity when the rollers are lowered.

Although the locating members 41 may be clamped to and unclamped from the workpieces W at the loading and unloading stations A and G, separate stations B and F located respectively between the loading station and the first work station C and between the last working station E and the unloading station have been included for these operations in the present instance. At these stations, suitable mechanisms such as power elevators and wrenches (not shown) may be provided for lifting the workpieces from the transfer bars 19 to permit the latter to retract, turning the bolts 51 to clamp or unclamp the locating members 41, and lowering the workpieces into the transfer bar recesses 24 while the bars are retracted.

The extent of the motions produced by the various power actuators above described may be positively limited by engagement of the pistons with the ends of the respective cylinders or by the provision of stops coacting with the movable parts. Control of these actuators and of other power operators (not shown) for advancing and retracting the tool heads 16 may be effected manually or automatically through power circuits and control parts which have been omitted for purposes of simplifying the disclosure and because the manner of interconnection of such circuits and parts to insure the desired operating sequence is well understood in the art.

*Operation*

Let it be assumed that groups of workpieces at the clamping, work and unclamping stations B, C, D, E and F have previously been operated on at these stations and are resting in the recesses 25 of the transfer bars 19 with the latter, the tool heads 16, and the various clamping and locating elements retracted. After the operator has loaded a new group of workpieces into the alined recesses 24 on the end portions of the transfer bars 19 and the recesses defined by the jaws 45 and 46 of the locating members 41 at the loading station A, a cycle is started by raising the rack bar 72 into driving engagement with the upper run of the chain 53. Then, the transfer actuators 22 are energized to advance the transfer bars and, through the connection provided by the rack bar, the chain 53 and the locating members 41 thereon. The strokes of the transfer bars are equal to the longitudinal spacing of the work stations from each other so that, as the bars advance, the workpieces supported in each group of recesses 24 will be moved to the next station and there positioned for proper operation of the locating and clamping elements.

After advance of the transfer bars 19, the elevator rods 25 at each work station are raised to lift the workpieces from the bars and press the same under light pressure into the downwardly opening V's 37 of the fixed abutments 38 shown in Fig. 3 to locate the workpieces horizontally and vertically in directions transverse to their axes. Also, the locating members 41 are raised by the lugs 62 on the elevator yokes 27. With the workpieces held under light pressure in the V's, the clamping projections 65 are raised to engage the undersides of the lugs 66 on the locating members and clamp the same against the abutments 42 as shown in Figs. 3 and 7, the workpieces turning into the proper angular position as permitted by the light clamping pressure of the jaws 28 and 29. The locating members being clamped rigidly to the workpieces and the abutments each being fixed relative to and spaced from the axis of a workpiece in the V's associated with the abutment, the workpiece will be disposed angularly about its axis in a predetermined position when the lug 66 of the locating member on the workpiece is clamped against the abutment. After the lugs have been clamped against the abutment, the full clamping pressure of the jaws 28 and 29 of the yokes 27 is applied to hold the workpieces seated in the V's 37.

At the clamping and unclamping stations B and F, the workpieces are raised from the transfer bars 19 when the latter are in their advanced positions. Then, the bolts 51 of the locating members 41 at the clamping station are turned into the bodies 43 to shift the movable jaws 46 outwardly to clamp the workpieces against the fixed jaws 45. At the unclamping station F, the bolts are turned out of the bodies of the locating members to retract the movable jaws and release the workpieces.

In the unloading station G, an operator removes the finished workpieces from the recesses 24 of the forward end portions of the transfer bars 19 while the latter is advanced. When this has been done and after the workpieces have been lifted above the bars at the other stations, the rollers 82 for the rack bar 72 are lowered to permit the latter to gravitate out of engagement with the chain 53 to the position of Fig. 2 and then, the transfer bars and the rack bars are retracted relative to the chain and into their starting positions.

While the workpieces are clamped rigidly in the V's 37 at the different work stations, the tool heads 16 are advanced and retracted along their guideways 17 to perform the drilling operations at the first work station C and the chamfer and reaming operations at the other stations D and E. Since the same locating member 41 remains attached to each workpiece as the latter progresses through and is operated on at each station, the workpiece is positioned accurately with the axes of the tools 18 at the second and third work stations alined with the axes of the holes 12 drilled at the first station.

Upon retraction of the tools 18 at each work station and after the transfer bars have been retracted, the clamping projections 65 are lowered out of contact with the locating lugs 66. After this, the elevator yokes 27 are lowered to seat the workpieces in the bar recesses 24 then located at the station as shown in Fig. 6. The workpieces at the clamping and unclamping stations B and F similarly are lowered into the bar recesses and the parts all are in their original positions ready for another cycle.

It will be apparent from the foregoing that elongated workpieces of circular cross section not having exterior surfaces suitable for direct contact with angular locating abutments may be located angularly about their axes and still leave areas exposed for direct contact by clamping elements which hold the workpieces rigidly during the metal removing operations. This is made possible by the novel locating members 41 which remain secured to the workpieces during their progress through the successive stations and which provide suitable surfaces spaced from the axes of the workpieces for engagement with the angular locating abutments 42. By virtue of their support on the endless chain 53 which advances in unison with the transfer bars, the locating members are returned from the unloading station G to the loading station A automatically as an incident to advance of workpieces through the stations and are retained approximately in the same positions relative to the workpiece path to facilitate clamping of the members to the workpieces and against the abutments 42.

We claim as our invention:

1. In a machine tool for operating on elongated workpieces of circular cross section, the combination of, a pair of laterally spaced bars supported for reciprocation horizontally back and forth in unison with each other and engageable with a series of said workpieces to support the latter in spaced parallel relation, power actuated mechanism operable to move said bars back and forth and carry the workpieces sidewise to successive dwell positions along a path, an endless link conveyor extending along said path between said bars and having spaced locating members thereon each adapted to receive and be clamped to one of the workpieces, means at each of said dwell positions providing fixed locating surfaces facing toward said path for engagement with said locating members and the workpieces to position each of the latter angularly about the longitudinal axis thereof and in two directions transverse to the axis, clamping elements at each of said dwell positions movable toward and away from said surfaces and engageable with the workpieces and said locating members to clamp the same rigidly against the surfaces, a conveyor shifting element connected to said bars for movement therewith longitudinally of said path and for movement relative to the bars transversely of the path and into and out of a shifting position of engagement with said conveyor, and means connected to said element for moving the same transversely of said path and said bars and into and out of said shifting position to couple the conveyor to the bars for movement therewith in one direction and to uncouple the conveyor for movement of the bars relative thereto in the opposite direction.

2. In a machine tool for operating on an elongated workpiece of circular cross section, the combination of, a work supporting member engageable with a series of said workpieces to support the same in spaced parallel relation and movable back and forth to carry the workpieces sidewise along a path and successively to a dwell position, a first abutment in said dwell position providing a fixed locating surface facing toward said path for engagement with a workpiece in the position, an endless conveyor extending along said path and having spaced locating members thereon each adapted to receive and be clamped to one of the workpieces, a second abutment spaced from said first abutment at said dwell position and engageable with said locating member to position the workpiece angularly about its longitudinal axis, clamping elements at said dwell position movable laterally of said path and engageable with the workpiece and the attached locating member to clamp the workpiece against said surface and the locating member against said second abutment, and a disengageable connection between said conveyor and said supporting member comprising an element connected to the member for movement back and forth therewith along said path and shiftable transversely of the path between a coupling position in which the element engages the conveyor for movement of the latter in unison with the supporting member in one direction longitudinally of the path and an uncoupled position in which the member is movable relative to the conveyor in the opposite direction.

3. In a machine tool for operating on elongated workpieces of circular cross section, the combination of, a work supporting member movable back and forth along a path and engageable with a series of said workpieces to support the same for movement successively to a dwell position along the path and with their axes disposed in predetermined positions relative to the path, a first abutment at said dwell position providing a fixed locating surface facing toward said path for engagement with a workpiece in the position, an endless conveyor extending along said path and having spaced locating members thereon each adapted to receive and be clamped to one of the workpieces, a second abutment spaced from said first abutment at said dwell position and engageable with said locating member to position the workpiece angularly about its longitudinal axis, clamping elements at said dwell position movable laterally of said path and engageable with the workpiece and the attached locating member to clamp the work piece against said surface and the locating member against said second abutment, and a connection between said work supporting member and said conveyor engageable for movement of the two along said path in unison during forward movement of the member and disengageable to permit shifting of the member backwardly relative to the conveyor.

4. In a machine tool for operating on elongated workpieces of circular cross section, the combination of, a pair of laterally spaced bars supported for reciprocation horizontally back and forth in unison with each other along a path and engageable with a series of said workpieces to support each of the latter with its axis disposed in a predetermined angular position relative to the path, power actuated mechanism operable to move said bars back and forth and carry the workpieces to successive dwell postions along said path, an endless link conveyor extending along said path between said bars and having spaced locating members thereon each adapted to receive and be clamped to a portion of one of the workpieces while leaving exposed portions on opposite sides of the workpiece free to engage clamping and locating parts, means at each of said dwell positions providing fixed locating surfaces facing toward said path for engagement with said locating members and said exposed portions of the workpieces, and clamping elements at each of said dwell positions movable toward and away from said surfaces and engageable with said exposed portions of the workpieces and said locating members to clamp the same rigidly against the surfaces, at least one of said surfaces and the corresponding clamping element for the workpiece at each of said positions being of V-shape to position the workpiece transversely of said axis thereof in two directions while permitting location of the workpiece angularly about its axis by clamping the locating member against the surface provided for the member.

5. In a multiple station machine tool for operating on elongated workpieces of circular cross section, the combination of, a plurality of stations for operating on said workpieces advanced sidewise and step by step to dwell positions along a path through the successive stations, an endless conveyor extending along said path and carrying locating members spaced apart longitudinally of the conveyor and each having spaced jaws adapted to receive and be clamped to one of the workpieces and defining a work recess opening laterally of the path, a plurality of abutments at each of said dwell positions providing fixed locating surfaces of V-shape facing toward said path and spaced apart longitudinally thereof distances corresponding to the spacing of said work recesses, means at each dwell position shiftable laterally of said path and engageable with the workpieces to seat the same against said surfaces for locating each workpiece in two directions transversely of its axis, and fixed abutments at each dwell position spaced apart along said path to engage the respective locating members to position the workpieces angularly about their axes while the workpieces are seated in said locating surfaces each of said members engaging only a portion of a workpiece therein while leaving exposed portions on opposite sides of the workpiece free to engage said locating surfaces and said laterally shiftable means.

6. In a multiple station machine tool for operating on elongated workpieces of circular cross section, the combination of, a plurality of stations for operating on said workpieces advanced step by step to dwell positions along a path through the successive stations, spaced abutments disposed at said dwell positions and having fixed V-shaped locating surfaces facing toward said path, an endless link conveyor extending along said path and having spaced locating members thereon each adapted to receive and be clamped to one of the workpieces, means at each of said dwell positions shiftable laterally of said path to engage a workpiece at the station to seat the same in the V of one of said abutments and thereby position the workpiece in two directions transversely of its axis, each of said members engaging only a portion of a workpiece therein while leaving exposed portions on opposite sides of the workpiece free to engage said locating surfaces and said laterally shiftable means, a fixed abutment at each of said dwell positions spaced from each of said V abutments and laterally from said axis of a workpiece seated in the V abutment and engageable with the locating member on the workpiece to position the workpiece angularly about its axis, and means at said station shiftable laterally of said path to engage the locating member on the workpiece at the station and clamp the same against said fixed abutment.

7. In a multiple station machine tool, the combination of, a plurality of stations for operating on elongated workpieces of circular cross section advanced step by step to dwell positions along a path through the successive stations, a first abutment disposed at each of said dwell positions and having a fixed locating surface facing toward said path for engagement with one of said workpieces, means providing a clamping surface at each of said dwell positions opposing said fixed surface and movable into engagement with a workpiece and toward the fixed surface to seat the workpiece against the latter, one of said locating and clamping surfaces being of V-shape for location of the workpiece in two directions transversely of its axis, a plurality of locating members spaced apart longitudinally of said path and adapted to receive and be clamped to a portion of one of the workpieces while leaving exposed portions on opposite sides of the workpiece free for engagement with said locating and clamping surfaces, a second fixed abutment at each of said dwell positions spaced from said fixed surface and the axis of a workpiece seated against the surface and engageable with said locating member to position the workpiece angularly about said axis thereof while the workpiece is seated in the V, a clamping member at each dwell position movable toward said second abutment and engageable with said locating member to seat the same against the abutment, and an endless conveyor supporting said locating members for movement along said path from a loading position to an unloading position through said operating stations and for return to the loading position.

8. In a machine tool for operating on elongated workpieces of circular cross section, the combination of, a work supporting member engageable with a series of said workpieces to carry the workpieces along a path and successively to a dwell position, a first abutment at said dwell position providing a fixed locating surface facing toward said path for engagement with a workpiece in the position, an endless conveyor extending along said path and having spaced locating members thereon each adapted to receive and be clamped to a portion of one of the workpieces while leaving other portions on opposite sides of the workpiece exposed, a second abutment spaced from said first abutment at said dwell position and engageable with said locating member to position the workpiece, and clamping elements at said dwell position opposing said abutments and movable laterally of said path and toward the abutments to engage an exposed portion of the workpiece and the attached locating member and clamp the same against the abutments, one of said locating surfaces and the opposed clamping element being of V-shape for positioning the workpiece in two directions transversely of its axis and the other abutment and opposed clamping element cooperating to position the workpiece angularly about its axis.

9. In a multiple station machine tool, the combination of, a plurality of stations for operating on an elongated workpiece of circular cross section advanced step by step to dwell positions along a path through the successive stations, spaced abutments disposed at said dwell positions and each having a fixed V-shaped locating surface facing toward said path to receive the workpiece and locate the same in two directions transversely of the axis of the workpiece, a locating member adapted to receive and be clamped to the workpiece, an angular positioning abutment spaced from each of said V abutments and the axis of the workpiece seated in the latter and engageable with the locating member to position the workpiece angularly about its axis, and means at each of said dwell positions shiftable laterally of said path and engageable with the workpiece and said attached locating member to seat the workpiece in the V of said abutments and the locating member against said angular positioning abutment, said locating member engaging only a portion of each workpiece while leaving other portions on opposite sides of the workpiece exposed for engagement with said locating surfaces and said laterally shiftable means.

10. In a multiple station machine tool, the combination of, a plurality of stations for operating on elongated workpieces of circular cross section advanced step by step to dwell positions along a path through the successive stations, a first abutment disposed at each of said dwell positions and having a fixed locating surface facing toward said path for engagement with one of said workpieces, means providing a clamping surface at each of said dwell positions opposing said fixed surface and movable into engagement with a workpiece and toward the fixed surface to seat the workpiece against the latter, one of said locating and clamping surfaces being of V-shape for location of the workpiece in two directions transversely of its axis, a plurality of locating members spaced apart longitudinally of said path and adapted to receive and be clamped to a portion of one of the workpieces while leaving other portions on opposite sides of the workpiece exposed for engagement with said locating and clamping surfaces, a second fixed abutment at each of said dwell positions spaced from said fixed surface and the axis of a workpiece seated against the surface and engageable with said locating member to position the workpiece angularly about said axis thereof while the workpiece is seated in the V, and a clamping member at each dwell position movable toward said second abutment and engageable with said locating member to seat the same against the abutment.

11. In a multiple station machine tool, the combination of, a plurality of stations for operating on an elongated workpiece of circular cross section advanced step by step to dwell positions along a path through the successive stations, first clamping elements at each of said dwell positions movable relative to each other transversely of said path and into clamping engagement with opposite sides of the workpiece to locate the latter in two directions transverse to the axis of the workpiece, a locating member having a projection and adapted to receive and be clamped to said workpiece with the projection spaced from the axis of the workpiece, said workpiece having at least a portion of its exterior on said opposite sides exposed for engagement by said first clamping elements when said locating member is clamped to the workpiece, and second clamping elements at each of said dwell positions supported for movement relative to each other transversely of said axis of the workpiece in said first elements and engageable with opposite sides of said projection to locate the workpiece angularly about its axis while the workpiece is seated in the first elements.

References Cited in the file of this patent

UNITED STATES PATENTS

| | | |
|---|---|---|
| 2,160,476 | Kampmeier | May 30, 1939 |
| 2,193,840 | Oberhoffhen et al. | Mar. 19, 1940 |
| 2,392,169 | Mansfield | Jan. 1, 1946 |

FOREIGN PATENTS

| | | |
|---|---|---|
| 304,909 | Great Britain | Jan. 31, 1929 |